June 24, 1958
F. C. TODD ET AL
2,840,807
NUMERAL DISPLAY DEVICE
Filed Feb. 25, 1954
3 Sheets-Sheet 1
Fig. I
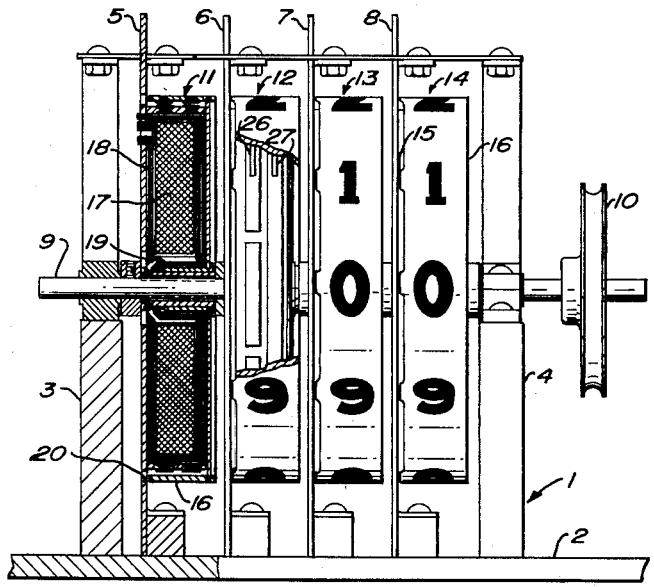
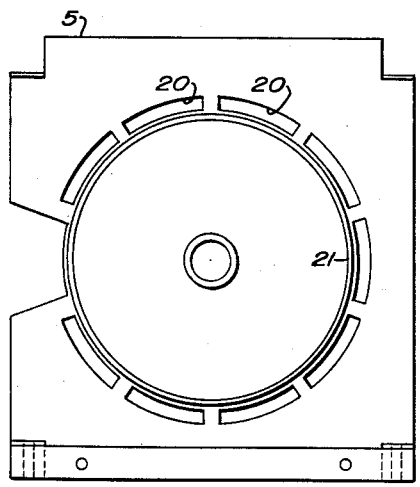
Fig. II
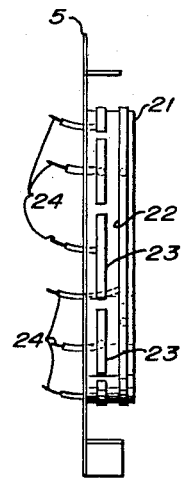
Fig. III
INVENTORS
FRANCIS C. TODD
JOHN L. COURTRIGHT
BY
Marshall, Marshall & Yeasting
ATTORNEYS June 24, 1958
F. C. TODD ET AL
2,840,807
NUMERAL DISPLAY DEVICE
Filed Feb. 25, 1954
3 Sheets-Sheet 2
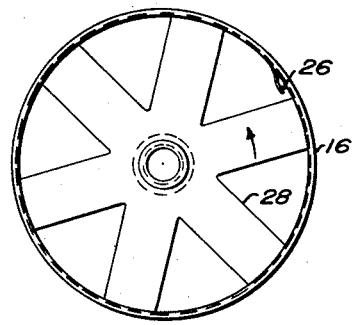
Fig. IV
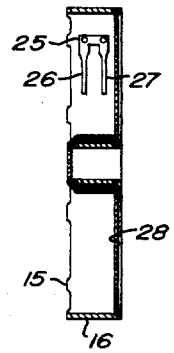
Fig. V
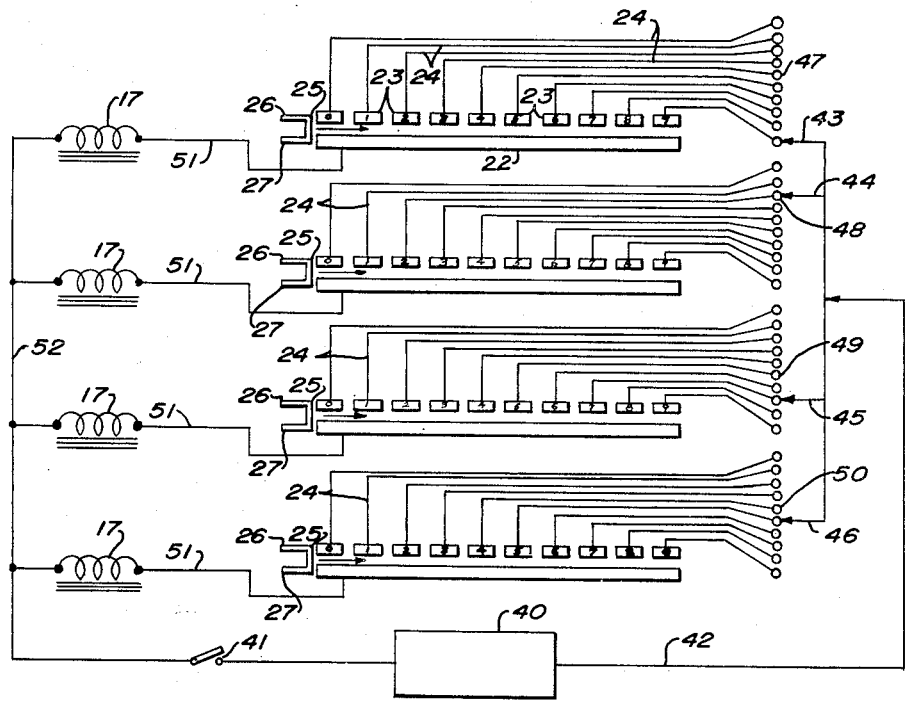
Fig. VII
INVENTORS
FRANCIS C. TODD
JOHN L. COURTRIGHT
BY
*Marshall, Marshall & Hasting*
ATTORNEYS June 24, 1958   F. C. TODD ET AL   2,840,807
NUMERAL DISPLAY DEVICE
Filed Feb. 25, 1954   3 Sheets-Sheet 3
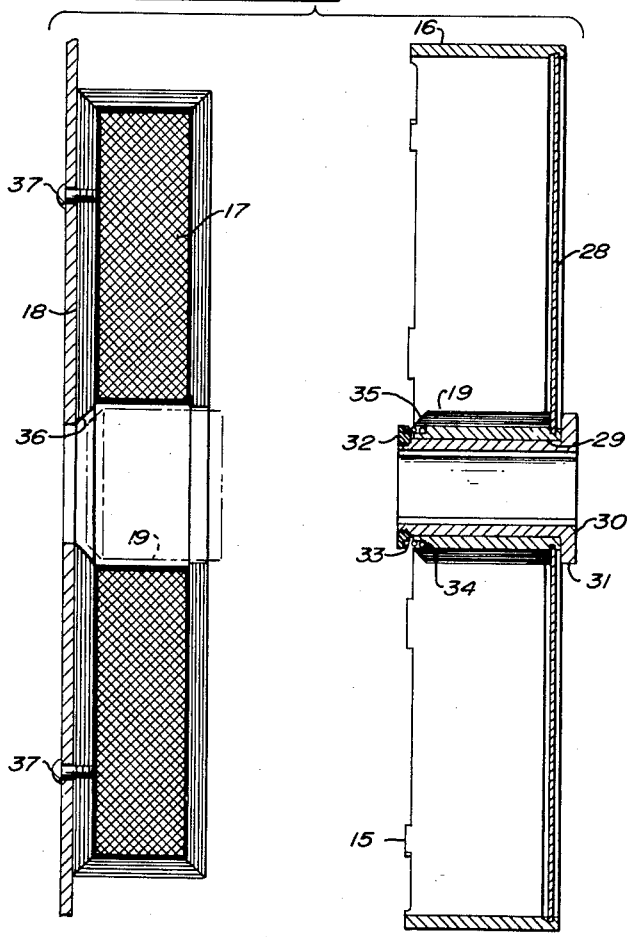
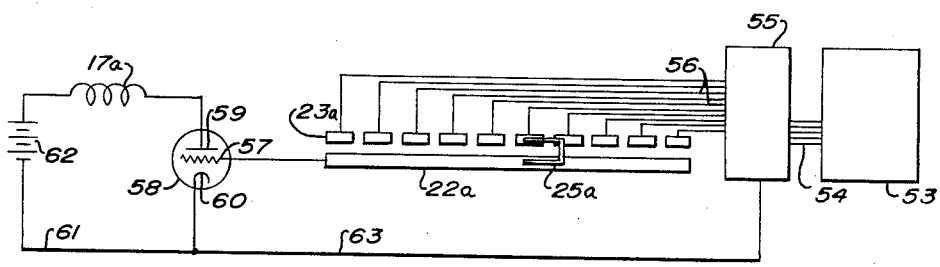
INVENTORS
FRANCIS C. TODD
JOHN L. COURTRIGHT
BY
*Marshall, Marshall & Keating*
ATTORNEYS United States Patent Office 2,840,807
Patented June 24, 1958

2,840,807

NUMERAL DISPLAY DEVICE

Francis C. Todd and John L. Courtright, Columbus, Ohio, assignors, by mesne assignments, to Toledo Scale Corporation, Toledo, Ohio, a corporation of Ohio Application February 25, 1954, Serial No. 412,447

5 Claims. (Cl. 340—378)

This invention relates to numerical display devices, sometimes known as "readout" devices, that are adapted to be actuated from the output of an electronic counter or a similar device.

It is desirable in many cases to display numerical figures corresponding to the count accumulated in an electronic counter or similar device in conventional plain, aligned figures so that they may be easily read even by inexperienced persons.

An ordinary electronic counter operates on a scale of two and thus its indications in each decade are made by combinations of neon lights; one light representing one; a second, two, a third, 4; and a fourth, 8. Thus any amount up to fifteen may be indicated by combinations of the lights. Ordinarily a reset is employed so that the counter resets to zero on the tenth impulse. When the counters are arranged to count higher numbers additional decades are added each having its four lamps. Some electronic counters are arranged to count by tens without resort to the binary system of countering. Such counters give individual indications for each of the ten units. However, these indications are usually spaced around a circle or along a straight line so that when several decades are used it is impossible to have the numbers aligned for display as they are in ordinary notation.

Another disadvantage of each of these indicating means for an electronic counter is that it is impossible to make a printed record directly from the indication. The record may be photographically taken but that method is inconvenient in many cases and can not provide aligned indications.

The principal object of this invention is to provide a mechanically-driven electrically-controlled indicating device that may be connected to an electronic counter and which, when so connected, immediately indicates in plain aligned figures the count that exists in the counter when the counter reaches a quiescent state.

Another object of the invention is to provide a simple self-contained display unit occupying little space in proportion to the size of the figures displayed.

A still further object of the invention is to provide an indicating device in which the numeral display wheels are continually in motion until they are stopped in positions corresponding to a count in the controlling electronic counter.

Another object of the invention is to provide an indicating assembly which automatically aligns the figures in correct reading position.

More specific objects and advantages are apparent from the following description of a preferred form of the invention.

According to the invention a plurality of indicia bearing drums are continuously urged into rotation by a continuously rotating shaft frictionally connected to each of the drums. A stationary magnetic coil mounted within the periphery of each drum, when energized, urges the drum axially into a position in which teeth or lugs protruding from the side of the drum engage notches or holes in a stationary separating plate adjacent the drum. A stationary commutator surrounding the magnetic coil cooperates with a brush on the interior of the indicia bearing drum to control the flow of current to the magnetic coil. As long as the brush does not find the energized commutator segment the magnet coil is de-energized and the indicia bearing drum is driven by its frictional contact with the drive shaft. When the commutator brush engages an energized segment the magnet is energized, the indicia bearing drum assembly is urged axially along the shaft, and the teeth on its periphery engage the next set of holes in the separating plate thus stopping the indicia bearing drum in position to indicate the number corresponding to the energized commutator segment.

A numeral display device constructed according to the invention is illustrated in accompanying drawings.

In the drawings:

Figure I is a front elevation, with parts broken away, showing the assembled numerical display device comprising four indicia bearing drums and mechanism for driving them into indicating position.

Figure II is a side elevation of a separating plate that is used to separate a drum and control from its neighbor.

Figure III is a front elevation of a separating plate showing a commutator arranged on an annular cylinder that is attached to the separating plate.

Figure IV is a side elevation of one of the indicia bearing drums.

Figure V is a cross section of the indicia bearing drum shown in Fig. IV.

Figure VI is an exploded cross-sectional view of an actuating magnet coil, its magnetic case, and the indicia bearing drum and armature that cooperates therewith.

Figure VII is a simplified magnetic wiring diagram showing a circuit for energizing the magnetic coil through the commutator from a source of signals.

Figure VIII is a simplified magnetic wiring diagram showing another form of circuit for energizing the magnetic coil of the indicating device.

These specific figures and the accompanying figures are merely to illustrate the invention but not to impose limitations on its scope.

Referring now to the accompanying figures and particularly to Figure I the improved numerical indication device is constructed on a frame 1 having a base plate 2, end pillar supports 3 and 4, and a plurality of dividers or separators 5, 6, 7 and 8. A shaft 9 journaled in the end pillars 3 and 4 is driven by a belt (not shown) running over a pulley 10. When the machine is in operation the shaft 9 is continuously rotated. The shaft frictionally drives a plurality of indicia bearing drums 11, 12, 13 and 14. Each of the drums, as may also be seen in Figures V and VI, has a plurality of laterally extending lugs or teeth 15 projecting from the side of a shell 16 forming the cylindrical body of the indicia bearing drum.

Fixedly mounted on each of the divider plates 5, 6, 7 and 8 is an electromagnetic coil 17 enclosed in an annular magnetic casing or shell 18. When the electromagnetic coil 17 is energized it draws its armature 19 axially to the left as seen in Figure I thereby drawing the indicia bearing drum 11 along with it so that the teeth 15 projecting from the side of the drum body 16 engage holes or notches 20 in the adjacent separator plate. The positive engagement of the lugs with the holes or notches 20 immediately stops the indicia bearing drum at one of ten possible stopping positions. Ten positions are provided because the device is to indicate in the decimal system of notation. Should some other system of notation be employed a different number of teeth and holes or notches would be employed. The teeth 15 are spaced or oriented with respect to indicia painted or otherwise printed on the periphery of the indicia bearing drum body 16 so that when the teeth engage the notches 20 the indicia bearing drum will be positioned to align one of the indicia in viewing position.

Figures II and III also show the commutator which comprises a thin cylindrical non-conducting shell 21 of a size to fit within any of the drum bodies 16. The shell 21 is attached to the adjacent separator plate or divider such as the divider 5. The outside cylindrical surface of the commutator shell 21 has a slip ring 22 completely encircling the shell and has ten segments 23 disposed along a circular path parallel and adjacent to the slip ring 22. There is one segment 23 for each of the indicia to be displayed. Leads 24 are brought out from each of the segments 23 as well as from the slip ring 22. As seen in Figures IV and V, a brush 25 having spring legs 26 and 27 is fastened to the interior of the indicia bearing drum 16. The brush leg 26 is arranged to bear on the segments 23 of the commutator while the spring leg 27 runs on the slip ring 22.

The shell 16 of one of the indicia bearing drums, as may be seen in Figure IV, is carried on spokes 28 extending radially from one end of the armature 19. This construction may be seen in greater detail in Figure VI and in particular their mounting into a sleeve 29 slipped within the armature 19 and slidably mounted and frictionally driven from a bushing 30 keyed to the shaft 9. As shown in Figure VI the sleeve 29 is urged against a collar 31 on the right end of the bushing 30 by a flanged nut 32 threaded on the bushing and bearing against an end of a helical return spring 33 compressed between the nut 32 and a shoulder 34 of the sleeve 29. The armature 19, a laminated iron ring, is rigidly attached to the sleeve 29. This armature 19 has its left end face beveled as at 35 to match a corresponding bevel 36 on one side of the magnet case or shell 18 of the solenoid or magnet coil 17. Preferably the magnetic case 18 is laminated. It is attached adjacent to the divider plate 5 by means of screws 37.

Normally, as long as the solenoid coil 17 is deenergized, the return spring 33 urges the sleeve 29 to the right as seen in Figure I or Figure VI so that the right end of the sleeve 29 frictionally engages the collar 31 of the bushing 30. This axial motion draws the teeth 15 from the notches 20 so that the indicia bearing drum is then free to turn with the shaft 9 and bushing 30.

When the solenoid coil 17 is energized it draws the armature 19 and attached sleeve 29 to the left as seen in Figure VI thereby compressing the return spring 33 and causing the teeth 15 to engage the corresponding notches 20. At this time the drum is still frictionally driven since the bushing 30 on which the sleeve 29 is mounted is still turning and since the nut 32 bearing on one end of the spring 33 also provides force tending to keep the armature 19 and sleeve 29 turning. Preferably the clearance between the seleeve 29 and nut 32 is set so that the air gap between the beveled faces 35 and 36 in the magnetic circuit never completely closes. Thus there is no frictional force tending to stop the indicia bearing drum and it will turn until the teeth 15 engage the sides of the notches thus positively registering the drum in one of the ten possible positions.

The electrical control for the solenoid 17 is schematically illustrated in Figure VII. As shown in this figure, electric current from a power source 40 may flow, as long as a switch 41 is closed, through a lead 42, branch leads 43, 44, 45, or 46 to selector switch 47 for a first or units indicia bearing drum assembly, a selector switch 48 for a second or tens decade assembly; a switch 49 for a third or hundreds decade, or a switch 50 for a fourth or thousands decade. Each of the selector switches has ten points corresponding to the ten numbers to be displayed by each of the drums. While selector switches are shown in the drawing it is to be understood that they are merely representative of a series of contacts arranged on a condition responsive device or other equipment the position of which is to be numerically indicated. Since the several decades of the indicating device are substantially identical the description will be limited to one of the decades, it being understood that proper setting of the other selector switches will cause corresponding operation in other decades.

From the selector switches 47, 48, 49 and 50 current flows through the selected ones of the leads 24 connected to the corresponding ones of the commutator segments 23. From the segments 23 current flows through the cooperating legs 26 of the brushes 25 and out through the other legs 27 to the slip rings 22 and thence through leads 51 to the corresponding solenoid coils 17 and then through a return lead 52 to the power supply 40. Each brush assembly 25 carried on the inside of the indicia bearing drums 16 is arranged to transfer from one commutator segment 23 to the next just as the teeth 15 come opposite the space between the holes 20 of the separator plates 5, 6, 7 or 8. Thus when the indicia bearing drum is stopped by energization of the solenoid coil 17 and the numbers are in registering position a circuit is still completed from that commutator segment through the brush to the slip ring 22. However, to allow maximum time for the coil to be energized and the armature to move into position where the teeth 15 will engage it is necessary to cause the rest position of the brush 25 on a segment 23 to be very near the trailing end of that segment. In other words, a small motion of the indicia bearing drum beyond its latched or registering position should cause the circuit to be completed through the next commutator segment.

A numerical indication display device such as is described herein wherein the drums are approximately five inches in diameter has been successfully operated with the shaft 9 turning approximately 150 revolutions per minute. At this speed it takes approximately four tenths of a second for the indicating wheels or drums to come to rest in indicating position. As long as one of the drums is not in its correct indicating position its solenoid is deenergized and it continues to rotate until it does find its proper position.

If the indicia or numeral displaying device is to be operated from an electronic counter or other condition responsive mechanism having high-impedance, low power indicating circuits it is necessary to interpose an amplifier between the commutator and the magnet coil 17. Such a circuit for one decade is illustrated in Figure VIII. In this figure, an electronic counter 53 has its output leads 54 connected to a resistor matrix 55 arranged to energize or apply a distinctive potential to one of ten output leads 56 according to the count in the electronic counter 53. The leads 56 are connected to corresponding commutator segments 23a and a brush 25a connects the segments one at a time to a slip ring 22a. The slip ring 22a is connected to a grid 57 of an amplifier tube 58. The plate circuit of the amplifier tube 58 includes the plate 59 of the tube, its cathode 60, a lead 61, a source of voltage such as a battery 62, one of the magnet coils 17a which in turn is connected to the plate 59 of the tube. The cathode 60 of the tube 58 is also connected through a lead 63 to the resistor matrix assembly 55 so as to cause the grid potential of the amplifier tube 58 to vary according to the distinctive signal produced from the resistor matrix 55.

In this arrangement there is practically no power drawn from the source of signals and the commutator passes a very small current.

Various modifications may be made in the details of construction of the drive and stop arrangement and of the indicia bearing drums without departing from the scope of the invention or losing the simplicity or advantages of energizing an indicia bearing drum control so as to latch the drum in indicating position during the existance of a signal and of releasing that drum for rotation as long as the position of the drum does not correspond to the signal being received.

Having described the invention, we claim:

1. In a device for displaying numerical data, in combination, a generally cylindrical hollow drum bearing indicia on its cylindrical surface, said drum having along one end a series of teeth one for each indicium to be displayed, a continuously driven shaft on which the drum is journaled and frictionally driven, a fixedly mounted solenoid coaxial with said shaft located within the indicia bearing drum, a support plate for said solenoid, said plate having means engageable with said teeth, resilient means urging said drum away from said support plate to disengage said teeth and allow the drum to rotate with the shaft, an armature carried on the drum and cooperating with the solenoid for urging the drum toward the plate, a stationary commutator concentric with the solenoid, brushes carried by the drum and contacting the commutator, and circuit means controlled by said commutator for energizing said solenoid for stopping said drum in selected positions.

2. In a device for displaying numerical data, in combination, a generally cylindrical drum bearing indicia on its cylindrical surface, a continuously rotating shaft journalling and frictionally driving said drum, a stationary support plate adjacent an end of said drum, resilient means urging said drum away from the support plate, electromagnetic means urging said drum toward the support plate, interengageable means on the support plate and drum for stopping said drum in definite positions when urged toward the support plate, a commutator mounted on the support plate, brushes mounted on the drum and contacting the commutator, and circuit means controlled by the commutator for energizing the electromagnetic means as a selected indicium approaches the display position.

3. In a device for displaying numerical data, in combination, a generally cylindrical hollow rotatable drum bearing indicia, a continuously rotating shaft journalling said drum, a friction drive between the shaft and drum, a support plate adjacent an end of the drum, resilient means urging said drum away from the support plate and into frictional drive with the shaft, a solenoid mounted on the support plate coaxial with the rotatable drum and generally within the drum, an armature for the solenoid attached to the drum coaxially of the shaft, a commutator mounted on the support plate coaxially of the shaft, brushes carried by the drum and cooperating with the commutator, interengaging means on the support plate and drum that are engaged by energization of the solenoid, said interengaging means providing definite stopping points for the drum equal in number to the indicia on the drum, and circuit means connected through said commutator to said solenoid for energizing the solenoid as the drum approaches a selected position.

4. In a device for displaying numerical data, in combination, a generally cylindrical hollow rotatable drum bearing indicia on its cylindrical surface, a continuously rotating shaft, a solenoid concentric with the shaft, a support plate for supporting the solenoid generally within the hollow drum, an armature for the solenoid slidably mounted on said shaft, said armature serving as a hub for the drum, friction means drivingly connecting the shaft and armature, resilient means urging the armature away from the solenoid to engage the friction means, a commutator mounted on the support plate, brushes on the drum engaging the commutator, circuit means connected through the commutator for energizing the solenoid, and interengaging means on the support plate and drum that are engaged upon energization of the solenoid to provide definite stopping positions for said drum.

5. In a device for displaying numerical data, in combination, a generally cylindrical hollow drum bearing indicia on its surface, a hub of magnetic material carrying said drum, a continuously rotating shaft journalling said hub, a solenoid of which said hub is the armature, a support plate for supporting said solenoid within said drum, resilient means urging said hub away from said solenoid and into frictional driving engagement with the shaft, a commutator surrounding said solenoid within said drum, said commutator having a segment for each indicium on said drum, brushes carried by the drum and cooperating with the commutator, circuit means connected through the commutator for energizing the solenoid to axially move said hub, teeth on the drum spaced according to the indicia on the drum, and means on the support plate engaged by the teeth when the hub is moved axially for providing definite stopping points for the drum.

References Cited in the file of this patent

UNITED STATES PATENTS

| | | |
|---|---|---|
| 983,190 | Wisner | Jan. 31, 1911 |
| 1,991,190 | O'Neill | Feb. 19, 1935 |
| 2,074,066 | Wheeler | Mar. 16, 1937 |
| 2,241,548 | Frisch Knecht | May 13, 1941 |
| 2,617,870 | Kern | Nov. 11, 1952 |
| 2,682,995 | Carey | July 6, 1954 |
| 2,733,008 | D'Andrea | Jan. 31, 1956 |